United States Patent
Maunuksela et al.

[11] Patent Number: 6,165,364
[45] Date of Patent: Dec. 26, 2000

[54] METHOD TO SOLVE THE SWELLING SLUDGE PROBLEM IN WASTE TREATMENT PLANTS BY CONTROLLING MYCELIUM BACTERIA

[75] Inventors: Jyri Maunuksela, Kuusankoski, Finland; Gwenda McIntyre, Liverpool, United Kingdom

[73] Assignee: Oy Finnish Peroxides Ab, Finland

[21] Appl. No.: 09/125,892

[22] PCT Filed: Mar. 28, 1997

[86] PCT No.: PCT/FI97/00175

§ 371 Date: Apr. 20, 1999

§ 102(e) Date: Apr. 20, 1999

[87] PCT Pub. No.: WO97/34833

PCT Pub. Date: Sep. 25, 1997

[30] Foreign Application Priority Data

Mar. 18, 1996 [FI] Finland ................................ 961247

[51] Int. Cl.$^7$ .................................................. C02F 11/02
[52] U.S. Cl. ............................................ 210/631; 210/764
[58] Field of Search ................................ 210/631, 758, 210/759, 764, 620

[56] References Cited

U.S. PATENT DOCUMENTS

| | | |
|---|---|---|
| 4,729,831 | 3/1988 | Fujino . |
| 5,120,442 | 6/1992 | Kull et al. . |
| 5,324,432 | 6/1994 | Robertson et al. . |
| 5,395,530 | 3/1995 | Robertson et al. . |
| 5,494,588 | 2/1996 | Lazonby . |
| 5,624,575 | 4/1997 | Meade et al. . |
| 5,965,033 | 10/1999 | Huss et al. . |

FOREIGN PATENT DOCUMENTS 2178735  2/1987  United Kingdom .

OTHER PUBLICATIONS

JP A 6233994=CA vol. 122, ref. 16362.

*Primary Examiner*—David A. Simmons
*Assistant Examiner*—Fred Prince
*Attorney, Agent, or Firm*—Ostrolenk, Faber, Gerb & Soffen, LLP

[57] ABSTRACT

Waste water in an activated sludge waste treatment plant is treated with a quantity of peracetic acid which destroys harmful filamentous microorganisms while preserving the beneficial microorganisms used in the purification procedure.

12 Claims, 10 Drawing Sheets

Effect of PAA on Sludge life and appearance

| PAA level applied in mg PAA/l | PAA dose in g PAA/kg biomass | Appearance of bulk sample | Microscopic appearance 72 hours after PAA application |
|---|---|---|---|
| 0 | 0 | Sludge as received - orange/brown mass, settled on standing for 72 hours to yield a black/brown (very sulphidic) sludge occupying approximately 1/2 the total sample volume with a clear yellow/grey liquor. | Well formed flocs and filaments with lengths up to 10 times cross sectional floc widths clearly visible. teaming with single cell bacterial life- cocci, bacilli and spirelli visible. No protozoa visible. |
| 8 | 2.4 | No immediate change on addition of PAA but after standing for 72 hours the sludge settled as a pale yellow/grey sludge occupying ~2/5 of the total sample volume with a clear yellowish liquor. | Well formed flocs and filaments as in untreated sample and teaming with bacterial life - rods and cocci. A higher proportion of segregated[1] filaments observed than in untreated sample. No obvious damage to filaments or broken filaments. A large number of protozoa - free swimming ciliates and rotifers were observed. |
| 50 | 14.9 | Immediately after PAA addition sludge floated for ~1-2 hours to give a sludge blanket occupying ~1/3 volume of the sample with a clear liquor. On improved mixing the sludge was redispersed. On standing for 72 hours without further mixing a settled yellow/brown sludge formed occupying ~1/3 of the total sample volume. | Sample teaming with bacterial life - rods and cocci, and with a very large number of free swimming ciliates and rotifers. Very clearly defined flocs. Filamentous species - segregated and smooth[2] still numerous but many broken/damaged filaments observed. A few branched[3] smooth filaments observed. |
| 150 | 44.8 | Immediately after PAA addition sludge floated for ~1-2 hours to give a sludge blanket occupying ~1/4 volume of the sample with a clear liquor. Improved mixing redispersed part of the sludge but some remained floating. On standing for 72 hours without further mixing a pale grey sludge formed - floating on top of a clear liquor with the sludge occupying ~1/6 of the total sample volume. | A high level of bacterial life - rods and cocci, still distinguishable flocs, no free swimming or stationary protozoa - rotifers or ciliates. Filaments - mainly segregated still present with some grossly[4] branched smooth filaments unseen in other samples. |

1 Segregated filament

2 Smooth filament

3 Branched filament

4 Grossly branched filament

METHOD TO SOLVE THE SWELLING SLUDGE PROBLEM IN WASTE TREATMENT PLANTS BY CONTROLLING MYCELIUM BACTERIA

BACKGROUND OF THE INVENTION

The objective of this application is to solve the problem created by mycelium bacteria is provided.

The problem of swelling sludge is common to waste treatment plants in general.

The swelling sludge is formed when overgrown mycelium bacteria is caught in the flocs preventing particulate settling. The mycelium starts to form when, for example, conditions of low oxygen or low nutrients exist. Mycelium bacteria generally survives using less of oxygen and nourishment than competitors and tolerates greater variations. In this specification and claims, the term "mycelium bacteria" indicates filamentous microorganisms, which include filamentous bacteria, filamentous fungi and filamentous actinomycetes.

The chain of the events that lead to dominance by mycelium bacteria can be started if the aerator breaks down or due to loading changes in the waste treatment plant. Loading variation is caused, for example, by down-time during holidays. In addition various toxic substances disturb the operation of the waste treatment plant.

Swelling sediment problems can be prevented in advance by equipment solutions and running conditions that favour bacteria forming faster growing flocs. Once the swelling problems occur they can be resolved more easily if treatment is started early. Chemical prevention of mycelium uses oxidising chemicals or chemicals to bind mycelium.

Chemicals, such as iron and aluminium salts, used to bind and then to improve the settling of mycelium flocs are typical of those used in water treatment. Their mode of action is based on floc binding capability. In high doses they can be considered to overcome the ridgidity of mycelium bacteria and thus allow flocs to caogulate. However, polymers and floccing chemicals do not reduce the survival capability of mycelium and can effect their natural removal.

The use of chlorine in the waste treatment plants functions in the same way as peracetic acid application and effectively destroys mycelium and lowers the total number of bacteria. With a reduction in the number of living bacteria those surviving will have more access to nutrients. The use of chlorine is cheap; however, environmental considerations may make this unacceptable.

If the growth of mycelium bacteria has been due to a lack of oxygen, the easiest solution is to add a number of aerators and to check their locations. Dosing by oxygen is more effective than aeration but demands more financial investment. Oxygen gas alone will not produce a disinfective effect which is required for the removal of an advanced mycelium problem. The effectiveness and efficiency of aeration by oxygen can be improved by a molecular screen.

Ozone effectively lowers the total number of microbes in the same manner as chlorine. The benefit of using ozone is that it decays to non-toxic substances. However, ozone is too reactive and expensive with regard to equipment investment. In addition, as with chlorine gas, safety aspects have to be considered.

Ozone is more reactive than hydrogen peroxide and peracetic acid which means that it is used on non-productive side reactions when used in mycelium prevention in an activated sludge waste treatment plant.

Hydrogen peroxide is cost-effective in terms of the level of investment required. In addition it is also versatile. It can be used to form plenty of soluble oxygen and has a disinfective effect when needed. Hydrogen peroxide severs chains of mycelium bacteria, destroying their attachment points and consuming their polysaccharide protective layer. Organic iron, copper and zinc compounds catalyse this reaction. The faster growing microbes forming flocs become dominant as mycelium bacteria suffer most from the hydrogen peroxide shock dose. The fast developing catalase activity and subsequent resistance to hydrogen peroxide limits its use.

DESCRIPTION OF THE INVENTION

The purpose of the invention being discussed is to propose improvements to the problems discussed above. Based on the invention peracetic acid is used in place of the usual treatment chemicals or in addition to them.

According to the invention peracetic acid is introduced in sublethal concentration to protozoa and vertebrates. The concentration of peracetic acid (PAA) introduced is preferably 0.5–45 g PAA/kg biomass, more preferably 1–30 g PAA/kg biomass and most preferably 2.4–20 g PAA/kg biomass.

Peracetic acid is a commonly used oxidising chemical. Peracetic acid used in disinfection is a balanced mixture of water, acetic acid, peracetic acid and hydrogen peroxide which means that it contains no entirely unnatural ingredients. Peracetic acid is an oxidising biocide in disinfectant solutions where the effect is concentrated on the surface of micro organisms.

It has been observed that too high PAA concentrations, e.g. more than 45 g PAA/kg (150 ppm) biomass, are detrimental to the sludge. While this decreased the sludge volume by 70%, the sludge floated, also there was some disinfection of the sample and neither of these is desirable for an activated sludge plant.

Test results suggest that there is a correlation between the PAA residence time in the sludge, and the reduction in sludge volume, so that preferred residence time was ~15 minutes, though positive effects are seen over a wide range (see suggested claim above).

There was also a correlation between pH reduction of the sludge and the reduction in sludge volume.

After use peracetic acid will quickly decompose into water and acetic acid. Previously, peracetic acid has been used in waste water treatment only to destroy pathogenic bacteria in sludge or water. It has been used to specifically target salmonella and coliformic bacteria before environmental release.

The use of peracetic acid as a bleaching agent and disinfectant is on the increase. Its immediate environmental effects are the same as hydrogen peroxide. The toxicity of peracetic acid to organisms is, however, a grade higher than hydrogen peroxide due to its ability to resist the catalase enzyme. The long-term environmental effects of peracetic acid can be seen to be the same as in case of acetic acid.

As an oxidising microbe pesticide peracetic acid decomposes faster and is less toxic than usual non-oxidising biocides. Peracetic acid decomposes a great deal in it's immediate environment by reacting with organic impurities. After sufficient dilution of decomposition the remaining substances are hydrogen peroxide and acetic acid.

The effects of peracetic acid target the smallest organisms such as microbes. Peracetic acid poses no risk to the environment. The acetic acid contained by peracetic acid slightly increases the organic loading and hence the oxygen consumption in receiving waterways; however, the oxygen contained in peracetic acid solutions compensates for this. By substituting more hazardous chemicals the effects of peracetic acid in the environment can be seen to be relatively positive.

When water-soluble, peracetic acid will not accumulate in organisms or be enriched within the ecosystem. Its acute median lethal values vary between 0.2 and 250 mg/l (for 100% per acetic acid). Aquatic organisms such as fish are ten times more sensitive than terrestrial organisms. Fresh water organisms are more sensitive than the salt water organisms to peracetic acid. In the case of smaller organisms or at the embryonic stage peracetic acid is more toxic. Peracetic acid is almost equally hazardous to algae as to fish i.e. when the $LC_{50}$ value is between 1–10 mg/l (100% effective substance). The effect of peracetic acid on microbes is noticed around 5–25 mg/l, functioning as a biocide and biostatic agent.

The catalase enzyme has a partial effect in reducing toxicity. Catalase is an enzyme which acts as a catalyst in the decomposition of hydrogen peroxide. Its molecular weight is often 225,000–250,000 g/mol. Many aerobic microbes, particularly fungi, are able to produce catalase and decompose hydrogen peroxide in their immediate environment. In disinfection applications too low doses of peroxide may allow catalase active microbe strains to become dominant and thus reduce the stability of hydrogen peroxide.

An essential difference between the use of peracetic acid and hydrogen peroxide in mycelium prevention is the different reaction by peracetic acid with the catalase enzyme. The natural catalase activity by microbes is induced when hydrogen peroxide is present, and hence hydrogen peroxide cannot be used effectively by itself in long-term applications.

Catalase decomposes hydrogen peroxide without any damage to itself. Peracetic acid functions because the per-acid part of the molecule binds to the active point in catalase preventing it's functioning. As an example of other catalase preventive agents, glutaraldehyde alone or in symbiosis with hydrogen peroxide does not help to bring a solution to the swelling sediment problem. In addition it is slightly more toxic than peracetic acid.

From tests performed it can be concluded that:

PAA treatment causes damage to filamentous microorganisms and reduces settled sludge volume when applied at the correct dose level for that particular sludge, optimally treated sludge recovers a protozoan and invertebrate population to above previous levels within several days although damaged filaments may still be visible in the sludge. The dose above with PAA inhibits development of a healthy sludge population will be specific to a particular sludge.

In order to be effective the PAA dose applied to cure bulking sludge should preferably be such as:
(i) to allow a reasonable residence time of PAA in the sludge at the treatment point (e.g. 10–20 minutes).
(ii) to allow as small, ~ a half unit, reduction in sludge pH following PAA consumption (this acts as good indicator that enough PAA is being added to counter de-stability effects from acid/base and metal complexation reactions due to presence of significants levels of biocarbonate and Ca or Mg species).
(iii) to allow settlement of treated sludge on standing for several hours i.e. no floating of the sludge as this indicates an overdose situation, and/or
(iv) to cause some bleaching sludge colours to indicate oxidation reactions have occurred.

The peracetic acid solution that is introduced to treat the mycelium bacteria can have a wide range of concentrations, and is often selected in the range of from 0.1 to 10% by weight, and in many instance within the range of from 0.5 to 15% by weight. Often, through not exclusively, the peracetic acid solution employed is obtained by reaction between hydrogen peroxide and acetic acid, so that the composition contains residual concentrations of the reactants in addition to peracetic acid. The compositions may have attained or approached equilibrium or may deviate significantly from equilibrium especially if the peracetic acid solution has been diluted with water shortly prior to its introduction, such as to dilute a solution containing between 10 and 20% by weight peracetic acid to a concentration of between 0.5 and 7.5% by weight.

The peracetic acid solution will often contain from 3 to 40% acetic acid, and particularly from 5 to 20% by weight on introduction or prior to dilution. The solution will also contain in many instances from 3 to 25% hydrogen peroxide by weight and particularly from 5 to 20%, on introduction or prior to dilution. In addition, the peracetic acid solution will in many instances contain sufficient mineral, eg sulphuric acid, such as from 0.2 to 1.5%, to promote the equilibration of the composition and one or more stabilisers, such as dipicoline acid and/or a polyphosphonate (hydroxyethylidenediphosphonic acid) in a total concentration of up to 1% and a proportion of 0 to 100% for each stabiliser.

EXAMPLE 1

This example describes a laboratory test to show the immediate decomposition of peracetic acid in a biological treatment plant and to estimate the effect of various concentrations on the treatment plant microbes. A secondary purpose is to serve as a basis for possible later research in the same or in a different treatment plant.

Materials and methods:

Chemicals:

The substance tested was the commercial mixture of 12% peracetic acid which contained 20% hydrogen peroxide and 18% acetic acid. The waste water sample were obtained from the biological plant.

Conditions:

The pH levels of the samples were 7.0 and 7.1. The temperatures were, on both occasions, +35 C. The temperature at the time of chemical application 30 C on both occasions. At the beginning the micro level was $10^5$ items/ml and after 6–7 days of growth it was $2*10^5$ items/ml. The dry weights of the samples were 5.0 g/l the first time and 7.6 g/l the second time. The biological treatment plant where the samples were collected from contained a short anaerobic stage lasting less than one hour followed by a 12 hour aerobic stage and a settling stage lasting for a few hours. The sampling point was from the return sludge flow with a velocity of 1 m³/s. The total liquid capacity of the plant was 100,000 m³.

Methods:

Peracetic acid was diluted to 1% content level and then added to a fresh 200 ml waste water sample and mixed. The targeted peracetic acid concentrations were 50, 100 and 300 ppm considered as 100% peracetic acid. An additional zero test was undertaken which had no peracetic acid added to it. The concentration of peracetic acid was measured from all the samples 1, 3, 5, 10, 15, 20, 25, 30, 45 and 60 minutes after initial addition. A microbe culture was taken from the sample and the pH level was measured.

Equipment:

A calibrated RQflex gauge based on light scattering was used to measure peracetic acid within a range of 0.2 . . . 23 ppm. Aeration of the samples was undertaken using a mechanical laboratory mixer with a speed of 200 rpm. An oxygen electrode was not used as decomposing peracetic acid increased the oxygen content.

Figure 1:
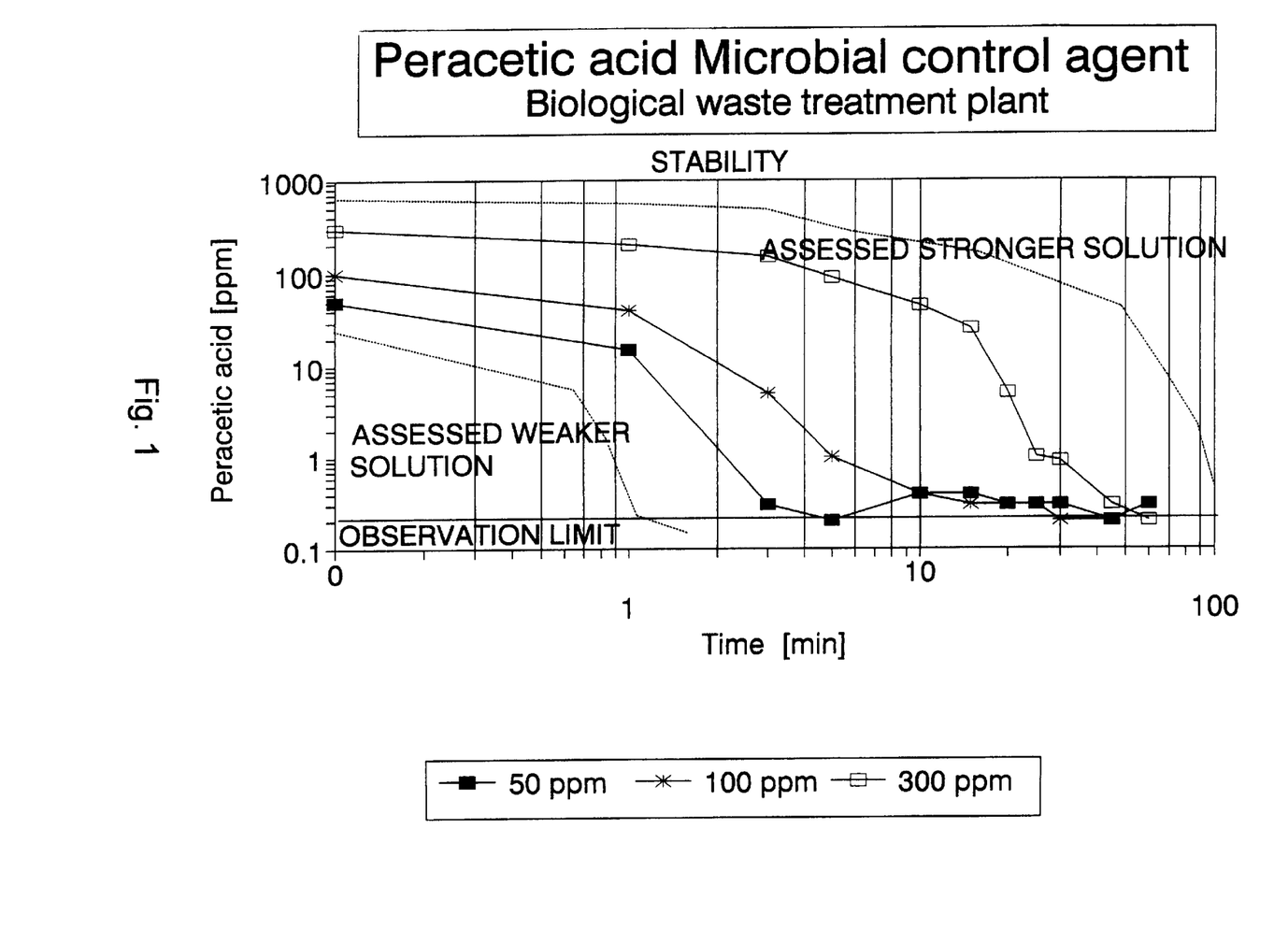
FIG. 1 shows decomposition of PAA in test solutions.

Results:

The decomposition of peracetic acid in all the test solutions up to the level of 1/100 from the original occurred in under half an hour. Decomposition was fastest in the weakest solution. The decomposition results are shown in FIG. 1. The effect of the peracetic acid on the number of microbes is shown in FIG. 1. Only the largest dose of peracetic acid stopped microbe activity. The peracetic acid concentrations used affected the pH level as follows:

50 ppm—no effect (pH 7.1)

100 ppm—pH dropped to the level of 6.1

300 ppm—pH dropped to the level of 5.8

Observations based on the results:

The peracetic acid decomposes immediately with the tested contents. The decay times lasted from under one minute to five minutes in the case of the first 8–10 decays. With concentrations beyond the tested range decomposition of peracetic acid slows down as the concentration of peracetic acid exceeds the number of impurities leading to an excessive amount of peracetic acid. When assessing the decomposition of peracetic acid to concentrations below 0.1 ppm (=1 micromol/dm³) concentrations start to decrease from the stated values due to dilution.

Peracetic acid only has an observable effect on the number of microbes at a concentration of 50 ppm. Peracetic acid has a significant effect at 100 ppm, with the microbe population dropping to 1/10 of it's original number. No microbe growth was observed at 300 ppm. It can be assumed that when the concentration is greater that 150 ppm the effect increases significantly and at 200 ppm microbe growth is stopped.

The plant description for hydrogen peroxide and peracetic acid tests in the biological waste treatment plant (examples 3 and 4):

The amount of forestry industry waste water received by the biological waste treatment plant is approximately 100,000 m³/day with a COD loading of 1 g/l. BOD reduction by the plant was 90% and the COD reduction was 50–70%. The amount of sludge recycled is equal to the amount of waste water received in 24 hours. The solid content at aeration was, in the initial stage or soon after 3 g/l both times. The normal concentration of solids in the aeration pool could be considered to be 4–5 g/l. The temperature of the aeration pool varies between 30–38 C. The aim is to keep the pH value as near as possible to neutral.

The biological waste water plant has occasionally had mycelium bacteria which prevent settling and cause the so called swelling problem.

EXAMPLE 2

The effectiveness of different concentrations of hydrogen peroxide and peracetic acid were compared by monitoring the total microbe amount for immediate and long-term effects using a microscope. The amount and stability of peracetic acid and hydrogen peroxide was monitored using fast methods such as pH paper. Oxygen consumption was monitored using oxygen sensors. Possible acute toxic effects were monitored using cladoceran tests. The operation of the plant was monitored, in addition to normal monitoring, by a few additional specifications in the laboratory.

The laboratory results showed that peracetic acid was more effective than hydrogen peroxide. Peracetic acid gave clear immediate effects on mycelium. The ridgidity of mycelium was reduced and their inner structures were revealed. The peracetic acid contents of 20–200 mg/l disappeared within 2–30 minutes. In laboratory tests only the hydrogen peroxide was not essentially found to reduce the total microbe amount between 0–5000 mg/l. Peracetic acid in an effective substance concentration of 100 g/l reduced the total bacteria amount by 90% and at 200 mg/l the total bacteria amount by 99% (table I).

TABLE I

The effect of hydrogen peroxide and peracetic acid on the waste treatment plant microbes. Laboratory test

| Sample location | Used $H_2O$ contents mg/l | Used PAA content mg/l | Incubation time at 38° C. min | Bacteria (cultivation, 37° C.) 3 days items/g | Fungus (cultivation at 25° C. items/g) 3 days | 6 days |
|---|---|---|---|---|---|---|
| Biological waste treatment plant, return sediment 3.8.95 pH 7.1 | 0 | 0 | | $7 \times +10^7$ | $6 \times +10^2$ | $7 \times +10^2$ |
| | 250 | | 15 | $3 \times +10^7$ | $2 \times +10^3$ | $2 \times +10^3$ |
| | 250 | | 45 | $2 \times +10^7$ | $1 \times +10^3$ | $1 \times +10^3$ |
| | 750 | | 15 | $1 \times +10^7$ | $3 \times +10^2$ | $5 \times +10^2$ |
| | 750 | | 45 | $2 \times +10^7$ | $8 \times +10^2$ | $1 \times +10^3$ |
| | | 100 | 15 | $2 \times +10^6$ | $3 \times +10^2$ | $3 \times +10^2$ |
| | | 100 | 45 | $1 \times +10^6$ | $2 \times +10^2$ | $2 \times +10^2$ |
| | | 200 | 45 | $2 \times +10^5$ | $1 \times +10^2$ | $1 \times +10^2$ |

EXAMPLE 3

50 mg/l of hydrogen peroxide was applied for two hours into the first aeration pool and 250 mg/l for four hours into the return sediment.

After addition of hydrogen peroxide the structure of the mycelium was slightly softened and their inner structures became visible. Actual structural changes became visible after a few days. Mycelium ends started to uncoil and the sides of the mycelium started to grow different, significantly narrower mycelium. However, no essential changes occurred in the settling of the sediment. There was favourable development occurring in the number of waste treatment pool organisms.

As with hydrogen peroxide, peracetic acid has applied undiluted straight from the container lorry into the return sediment canal over six hours. Flow was regulated using a valve and a magnetic flow meter. The target concentration was sufficient to destroy 90% of the passing return sludge. On the whole, half of the total sludge was treated. By applying lime the pH level were normalised.

When applying peracetic acid one week after the application of hydrogen peroxide, concentrations fell in the return sludge faster than expected. The reason was the strong mechanical mixing occurring in the return sludge canal which together with the chemical effect of peracetic acid reduced the size of the floc. This was found by taking a sample after the application point and by mixing it only lightly. The peracetic acid application dose was controlled by measuring the peracetic acid content from the return sediment canal after the application. After peracetic acid application the waste water managed to flow in the channel about 30 seconds before it was connected with the waste water received. Hydrogen peroxide concentrations in the peracetic acid solution fell faster than the peracetic acid concentrations.

Figure 2:
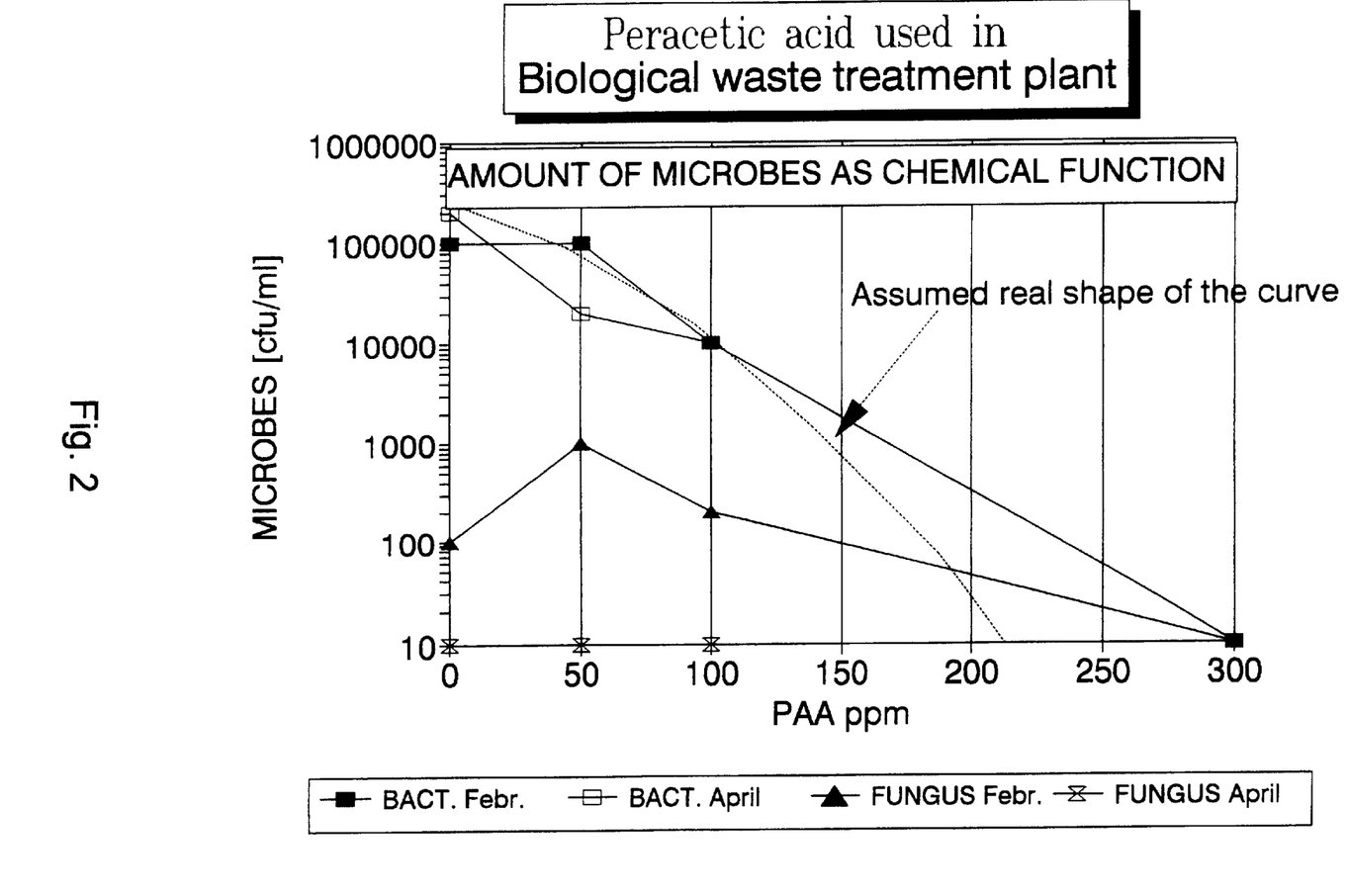
FIG. 2 shows PAA concentration in an aeration pool.

At its maximum the pH effect was larger than one pH unit but after having been fully mixed with the sediment the pH effect was entirely balanced. This phenomenon is usual due to, for example, the effect of the buffer effect of the fibres in paper plant disinfection. There were no measurable concentration (less than 1 mg/l) of peracetic acid in the first aeration pool. The results are shown in FIG. 2.

Figure 3:
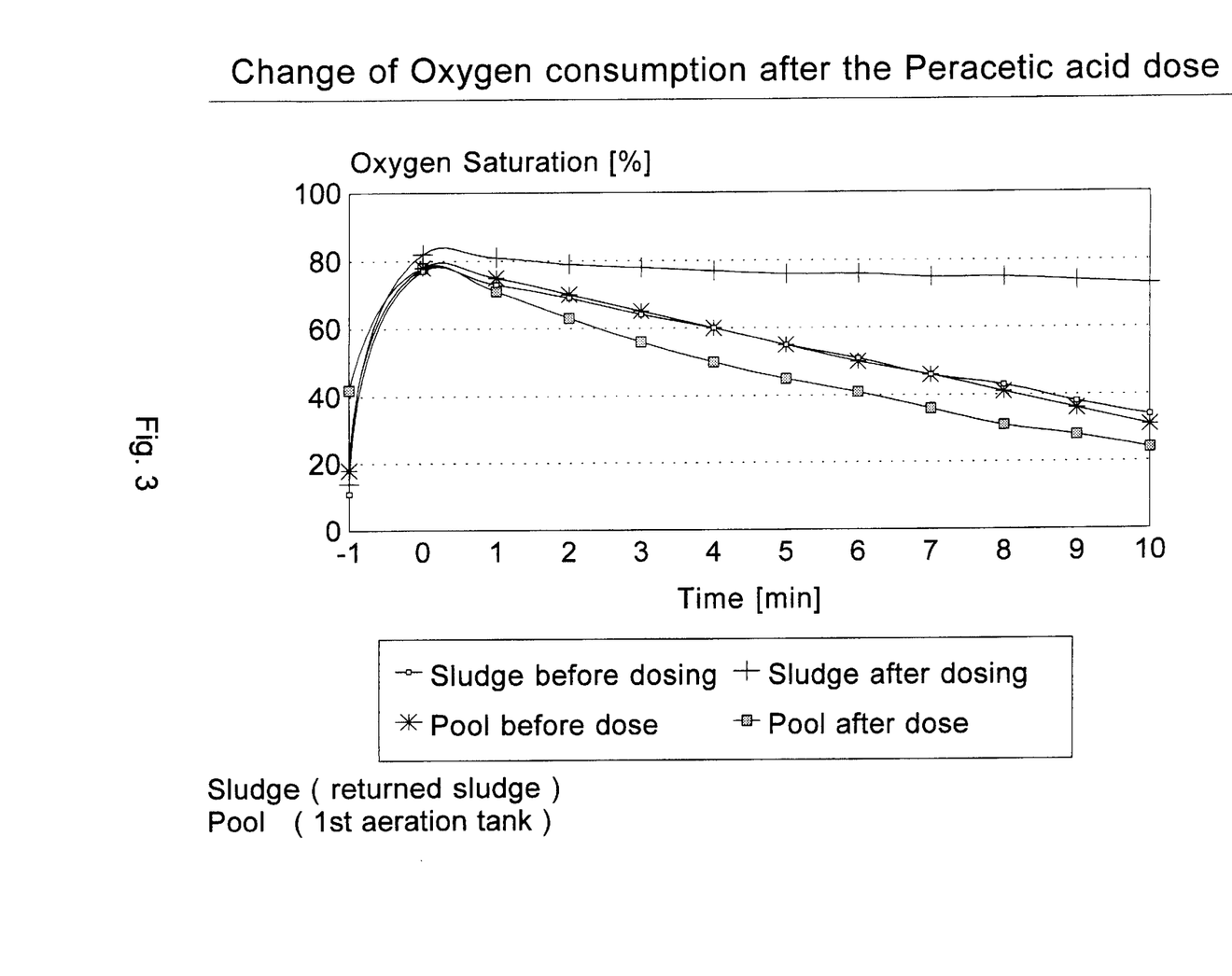
FIG. 3 shows change of oxidation consumption after PAA dosage.

The oxygen consumption was not reduced in the aeration pool. The oxygen consumption dropped significantly during peracetic acid application in the return sediment samples (FIG. 3). FIG. 3 shows the results of measurements where the saturation level of oxygen was measured before and after the peracetic acid treatment (PAA). Peracetic acid itself contains active oxygen so the additional oxygen was removed using a vacuum and then it was oxidised as the other samples. Oxygen saturation levels were calculated using a calibration factor. The delineator shows that after addition of peracetic acid the biological activity was reduced almost totally in the return sediment pool in contrast to the aeration pool where the decomposed peracetic acid accelerated oxygen consumption.

No toxicity was observed in the cladoceran tests in the water leaving the treatment plant once the peracetic acid application cycle had reached it. The waste water which had passed during the test was compared with the comparison sample. No essential change was observed over short periods in micro organism reproduction. Primitive organisms were found to be not moving in the samples taken immediately after the application but their total number continued to increase.

Immediately after peracetic acid application the threading of the mycelium was increased and they soon became striped when the cell gaps grew due to the swelling. The structure of the mycelium was softened and a part of tem threaded around themselves. Among the longer term effects were that the mycelium and the flocs coagulated. The flocs started to be formed around the mycelium gatherings. The cell structure around the mycelium was disturbed and a part of the mycelium was split. Within approximately one week these phenomena led to improved sludge settling. Peracetic acid can penetrate a living cell and destroys the cell when it disintegrates and reacts there. A part of this effect is likely to be due to the physical effects of oxygen gas formation resulting in a tearing of the cell structures.

After peracetic acid application the anaerobic stage was used at the beginning of the first aeration pool. A decrease in the chemical or biological oxygen consumption which was feared did not occur with the decrease in biological activity. Instead nitrogen emissions showed an increase after application. The increased levels of nitrogen were most likely due to decomposition of the flocs and bacteria.

Figure 4:
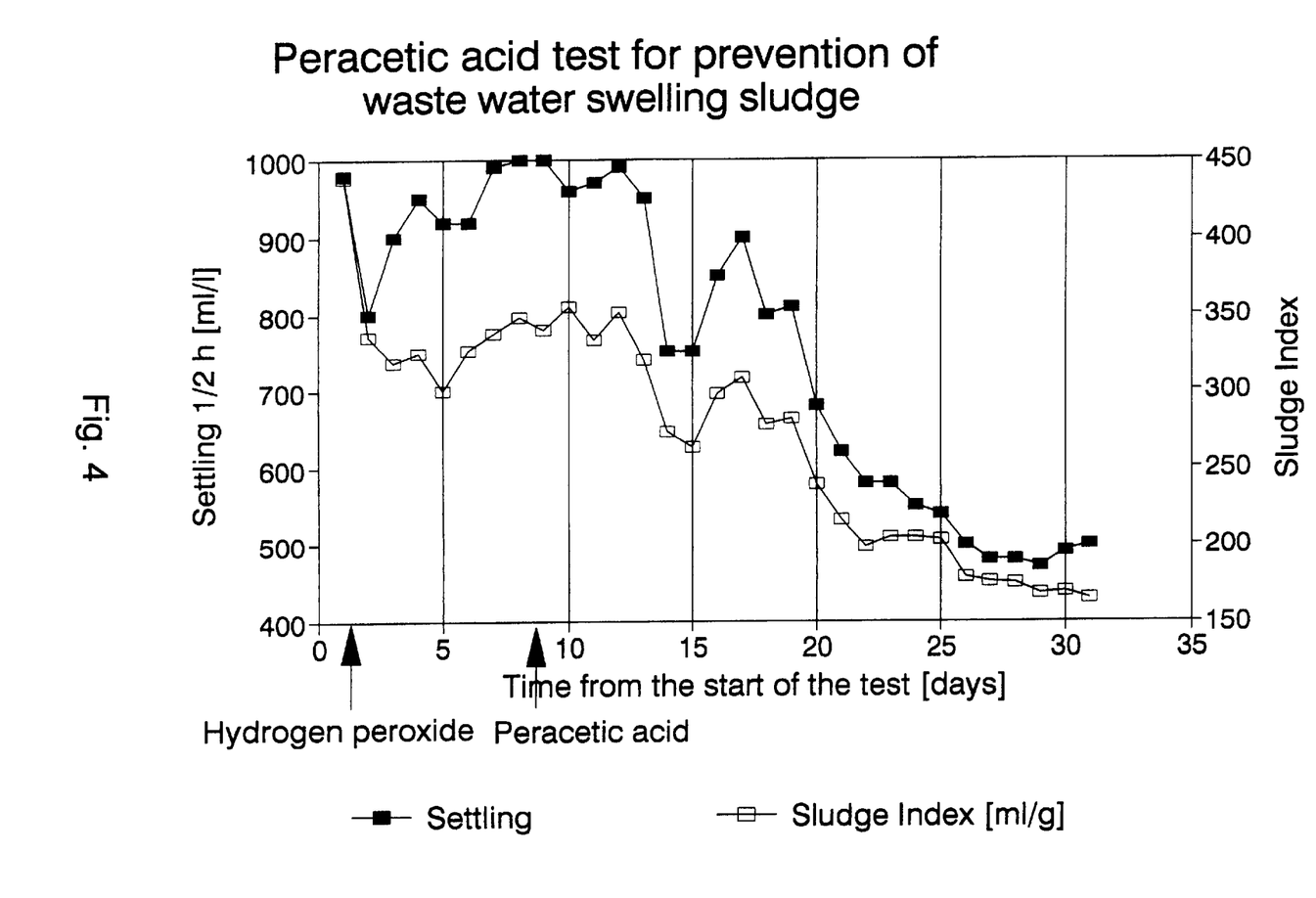
FIG. 4 shows effect of hydrogen peroxide and PAA application on sludge index.

To summarise the test the polymeric feedings was stopped, settling and the sludge index improved (FIG. 4), solid emissions stopped, the BOD and COD reductions were improved, number of microorganisms increased, the mycelium bacteria were damaged and the flocs coagulated to a greater degree. The delineator of FIG. 4 shows the effect of hydrogen peroxide application and peracetic acid application on the sludge index and 1–2 hour settling. Time from the start of tests has been shown over 24 hrs. Hydrogen peroxide addition had a momentary effect on settling and a slight effect on the sludge index. This effect may be similar to the improving effect on the water removal ability by hydrogen peroxide.

The results show that peracetic acid can be used safely and effectively for the prevention of the mycelium bacteria. In terms of costs the treatment is no more expensive than the equivalent hydrogen peroxide treatment.

Conclusions from test run show that run difficulties in the biological water treatment plant may easily lead to problems caused by the mycelium bacteria surviving under conditions of very low oxygen concentrations. A preventative method to reduce slow growing bacteria and improve the conditions for growth of the faster growing microbes should be considered. Additional aeration and the introduction of nutrients to strengthen normal growth and thus reduce space for mycelium growth is suggested. By producing additional chemical oxygen using peroxides it can be accurately aimed at desired points. In addition their disinfective effect is mostly aimed at the largest microbes in terms of surface area i.e. at mycelium which in addition are not within the protective flocs.

The identification of the mycelium problem, before they smother other growth by becoming stiff and filling the sediment pool, in time aids in remedial solutions, based on the test runs undertaken peracetic acid has a crucial role in improving the situation once it has become a problem.

EXAMPLE 4

In the case of the municipal water treatment plant the swelling sludge problem had been caused by a overloading situation. In addition, the sliming of the waste water was a problem. Positive effects on prevention of the sliming were achieved in laboratory tests only with peracetic acid. This was based on loosening the biomembranes by peracetic acid.

Under laboratory conditions hydrogen peroxide functioned poorly for the desired mycelium prevention purpose. However, it was applied as the plant had problems regarding a lack of oxygen. The hydrogen peroxide was helpful with regard to oxygen sufficiency but it did nothing about the mycelium problem.

After application of hydrogen peroxide the plant was administered hypochlorite which, however, had no noticeable effect. After hypochlorite, 75 mg/l of peracetic acid was applied in the return sediment over 24 hours on both lines of the plant and the effects were favourable. Sludge indices fell, the mycelium were found damaged and floc formation was improved.

EXAMPLE 5

Materials/Methods

PAA used was 0510 grade, the sample contained 5% PAA, 20% $H_2O_2$ and 12% acetic acid.

The sludge sample was obtained from the final outflow of the oxidation ditch and was approximately half as dilute in terms of MLSS (mixed liquor suspended solids) as the sludge in the RAS (returned activated sludge) sump where PAA had been applied on-site.

Experiment 1. PAA lifetime in sludge

PAA was added to sludge samples with magnetic stirring. PAA and $H_2O_2$ levels in sludge were monitored periodically with indicator strips whilst continuing to mix samples.

Experiment 2. Effect of PAA on sludge appearance and life

PAA was applied to samples of sludge with magnetic stirring to mix. Samples were agitated for several hours after consumption of PAA and $H_2O_2$ and then left standing unstirred for 72 hours. The microscopic appearance of the samples was checked at ×40 and ×100 (phase contrast) magnification.

Results

1. Biomass concentration in sample

The sample of sludge received was taken from the oxidation ditch and was found to contain 3.35 g/l as dry weight suspended solids, this is equivalent to the MLSS (mixed liqour suspended solids) value for the aeration plant and is approximately half the strength, in biomass concentration, of the RAS (returned activated sludge) under normal plan operation. Full scale dosing was applied into RAS feed.

Using the biomass concentration figure of 3.35 g/l (dry weight) for the sample received it was possible to calculate PAA dose levels applied in terms of g PAA/kg biomass (where PAA is as 100% peracetic acid).

2. PAA lifetime in sample at various initial PAA dose levels.

| PAA level applied in mg PAA/l | PAA dose in GAPA/kg biomass | Approximate residence time in minutes |
| --- | --- | --- |
| 8 | 2,4 | 3 |
| 25 | 7,5 | 7 |
| 75 | 22,4 | 20 |
| 150 | 44,8 | 60 |

Figure 5:
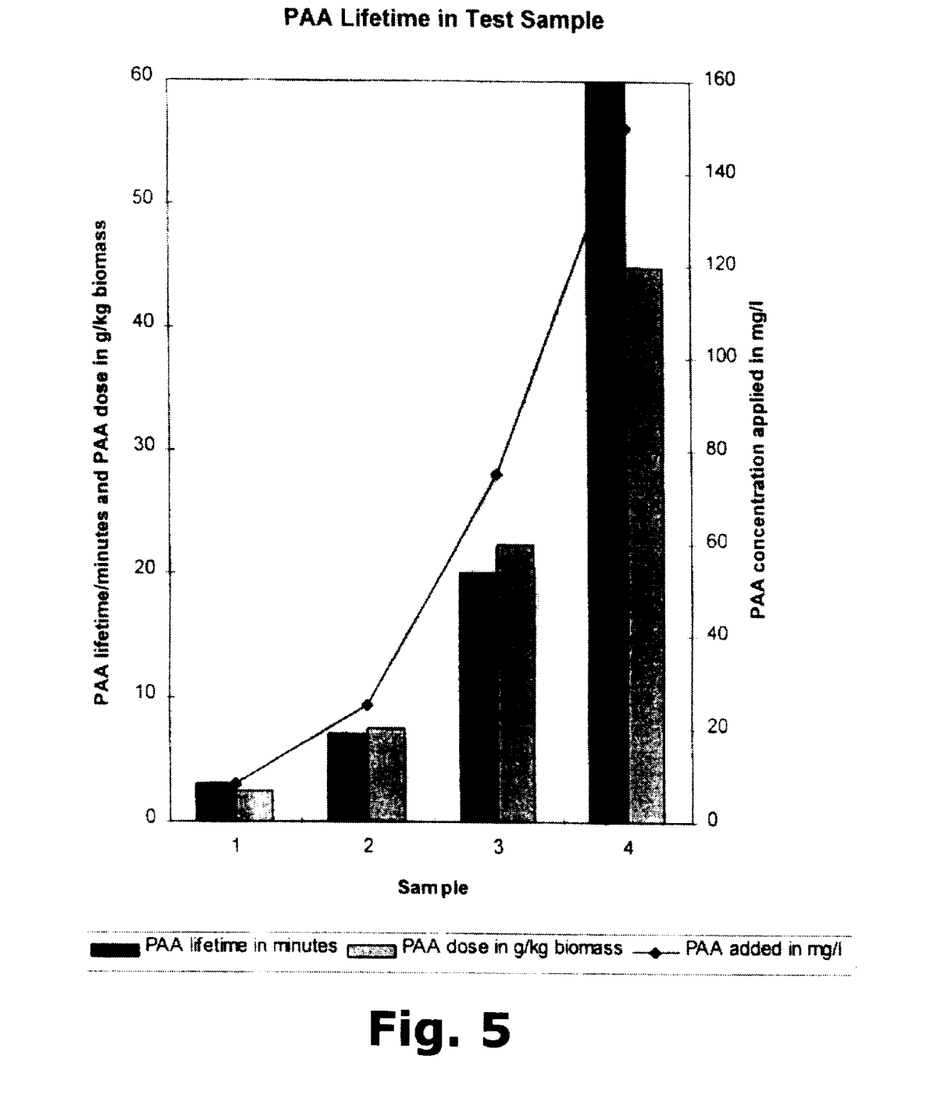
FIG. 5 shows PAA lifetime in a test sample.

See FIG. 5

3. Metal ion concentration in sample

ICP analysis of clarified, disinfected sample water indicated that there were no heavy metal species present in the effluent at significant level. Calcium and magnesium levels were however significant—Ca ~108 mg/l, Mg ~9 mg/l.

4. Effect of PAA on sludge ecology and bulk characteristics Microscopic examination revealed little major, change in sludge ecology or filament appearance immediately after PAA addition, however after standing for 72 hours and re-examining the sludge major changes were noted—FIG. 7.

Figure 7:
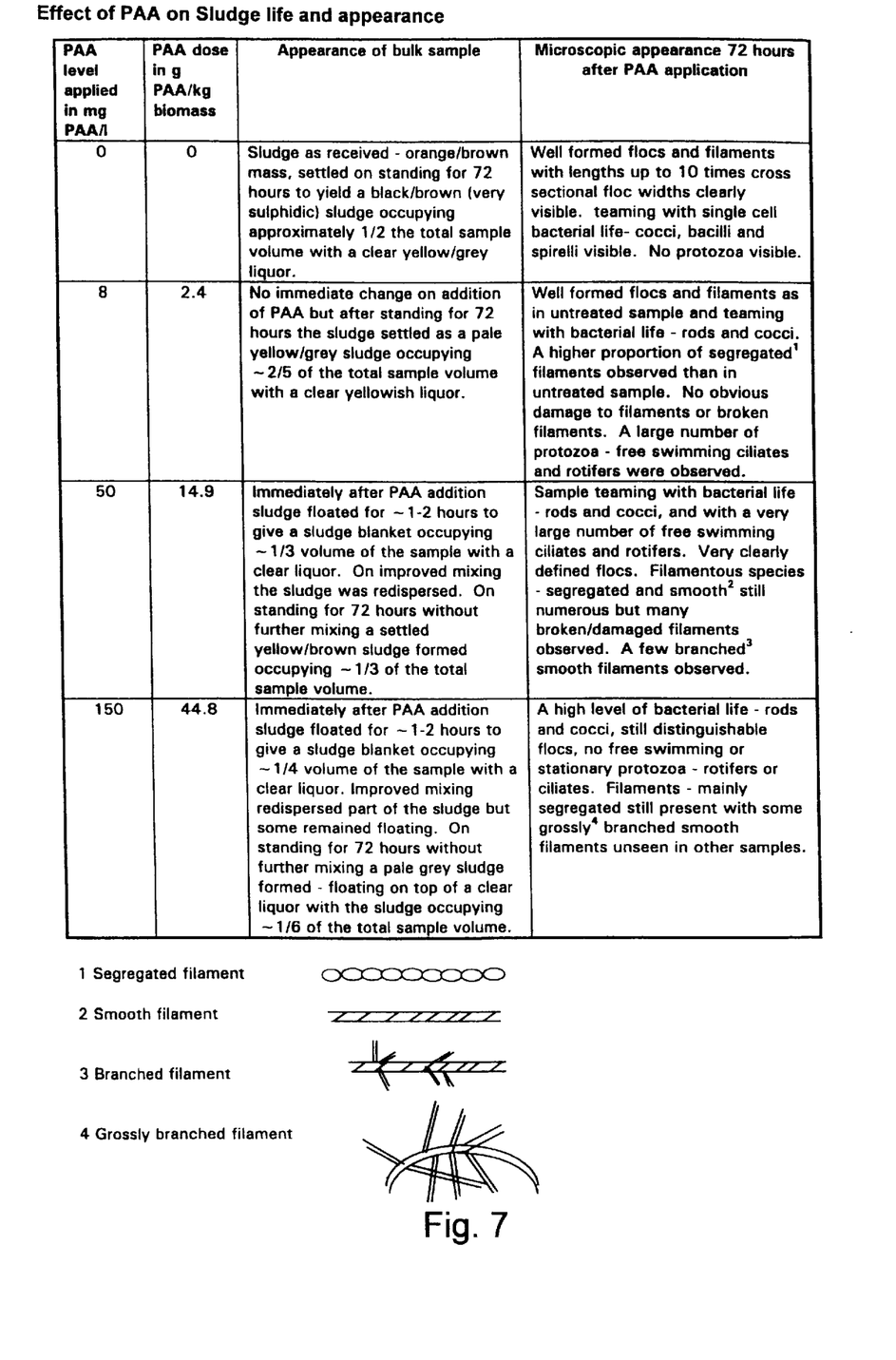
FIG. 7 shows microscopic examination results.
Figure 8:
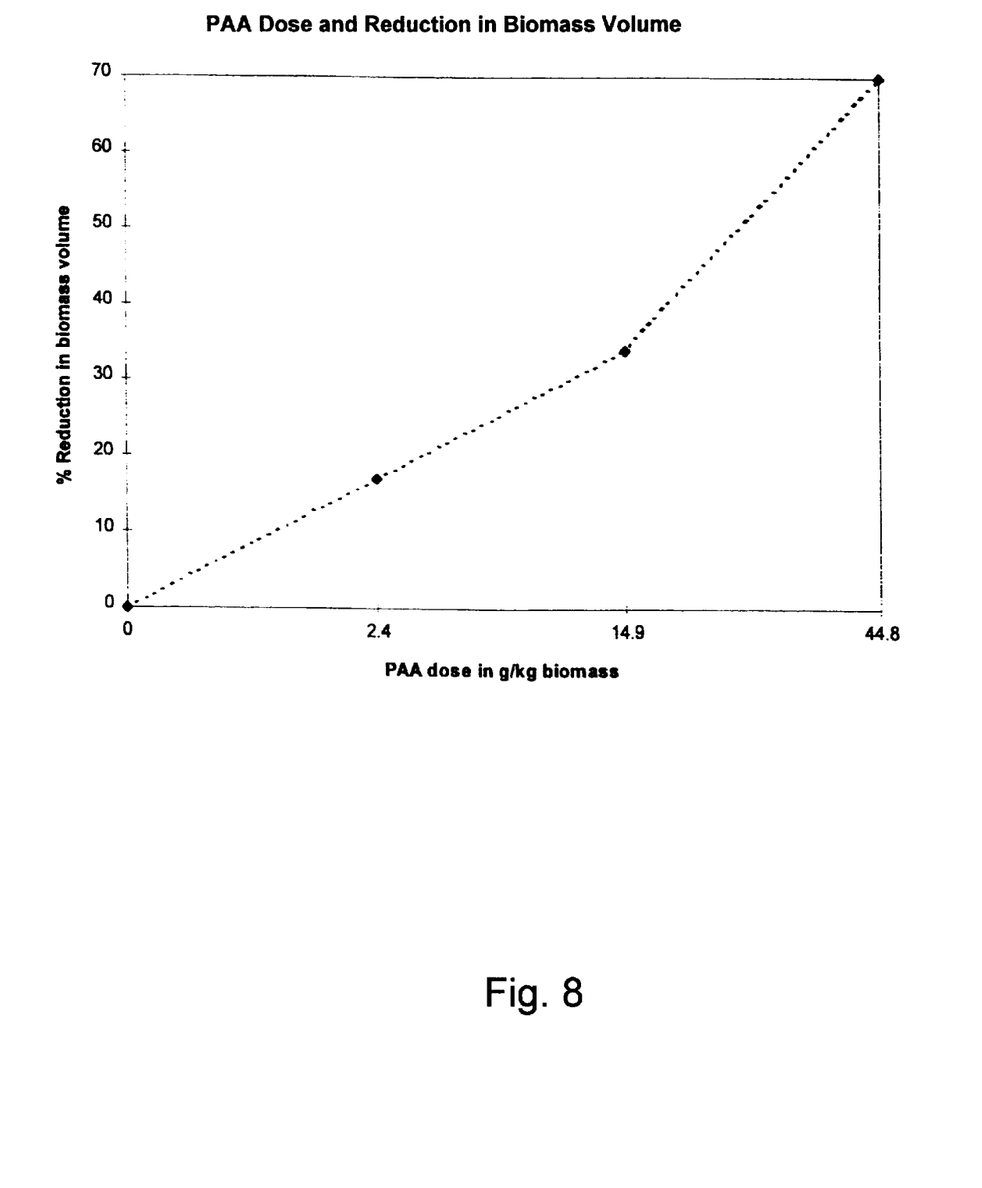
FIG. 8 shows the relationship between PAA dose and reduction in biomass volume.

From FIGS. 7 and 8 it can be seen that treatment with PAA had a marked effect on the bulk characteristics of test sludge on standing. Even at the lowest dose applied of 8 mg/l PAA (2.4 g PAA/kg biomass) the settled sludge volume was reduced by ~17%. At 50 mg/l PAA dose (14.9 g PAA/kg biomass) the settled sludge volume was reduced by ~45%. At the highest dose applied of 150 ppm PAA (44.8 g PAA/kg biomass) the sludge floated rather than settled on standing, with the floating sludge volume reduced by ~70%.

Figure 6:
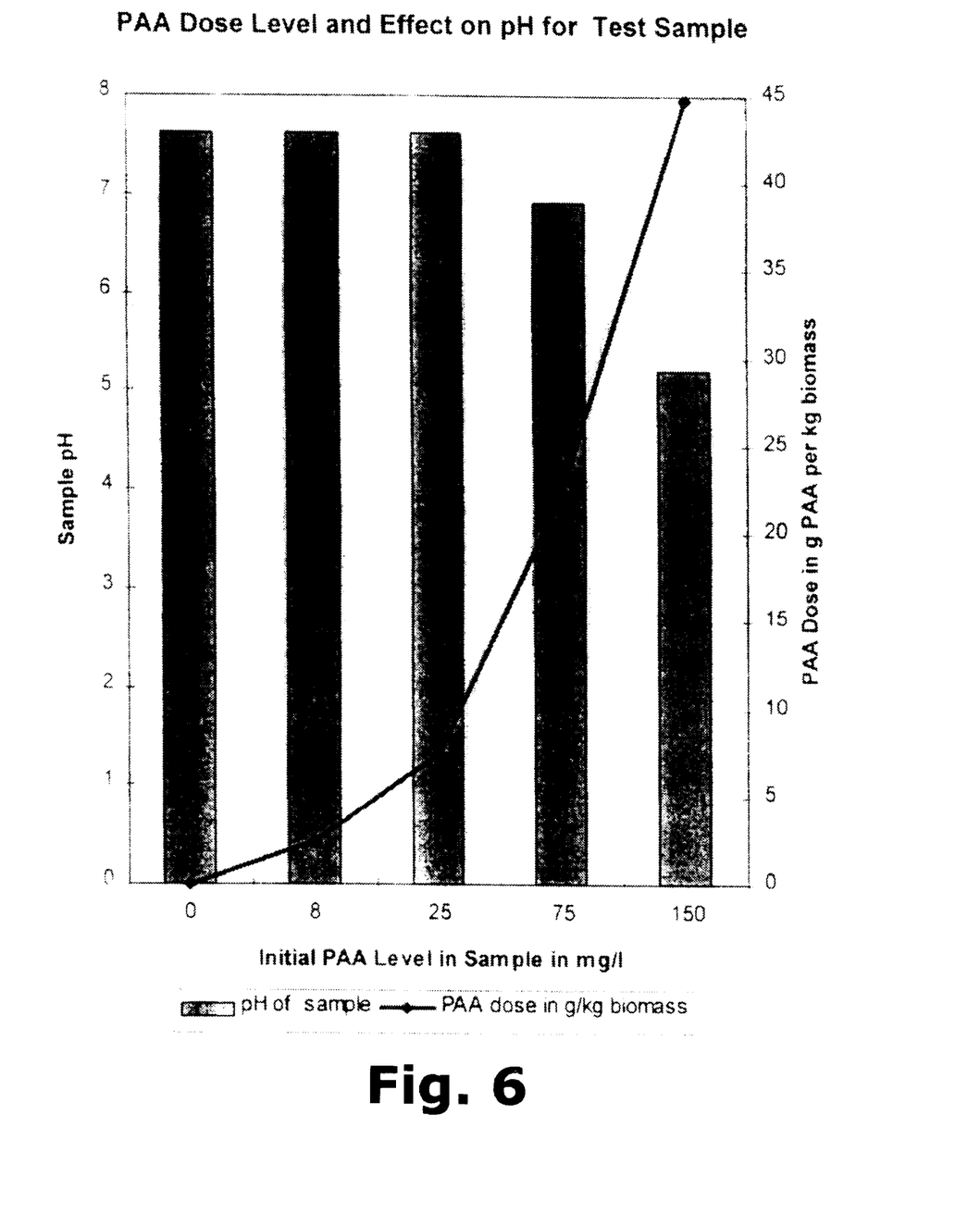
FIG. 6 shows the dosage level effecton pH.

PAA dose also affected the pH of the samples with increasing PAA dose level reduced sample pH, see FIG. 6.

EXAMPLE 6

Figure 9:
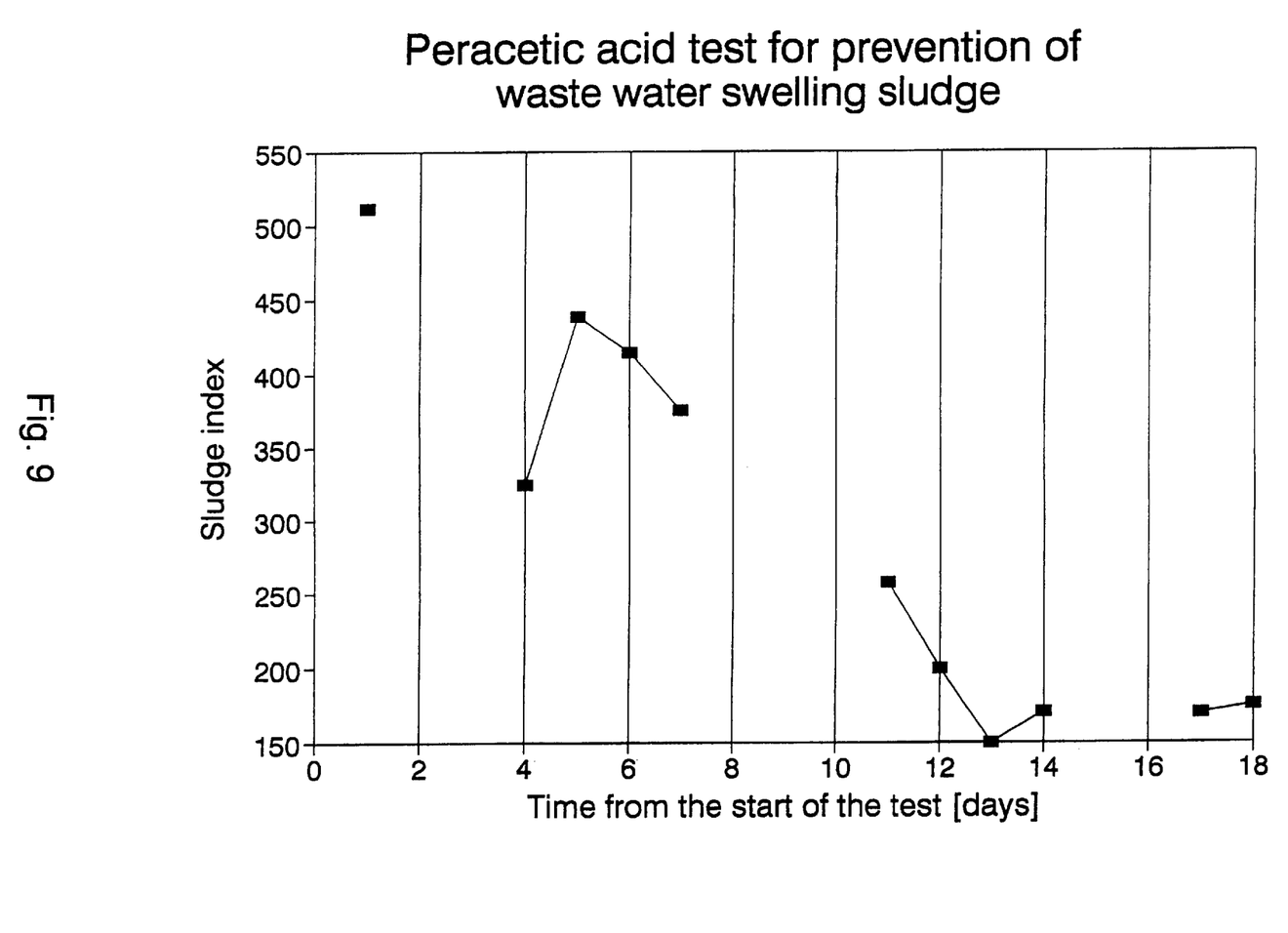
FIG. 9 shows PAA effect on sludge index.

Example 3 was repeated and scaled down to a smaller paper mill in biological waste water treatment plant. Peracetic acid (12%) was dosed 3.6 tonnes to returned sludge canal to the treatment plant size of 12 000 m³. Concentration of peracetic acid was 100 mg/l during 15 hours. Half life of peracetic acid was 1–2 minutes. Sludge was returned at rate 600 m3/h. Initial DSVI was 511 and under the two weeks from treatment DSVI was 150. Dry substance was between 3.6 and 4.2 during the trial. Results for sludge index are shown in FIG. 9. The treatment solved the sludge debulking problem.

Figure 10:
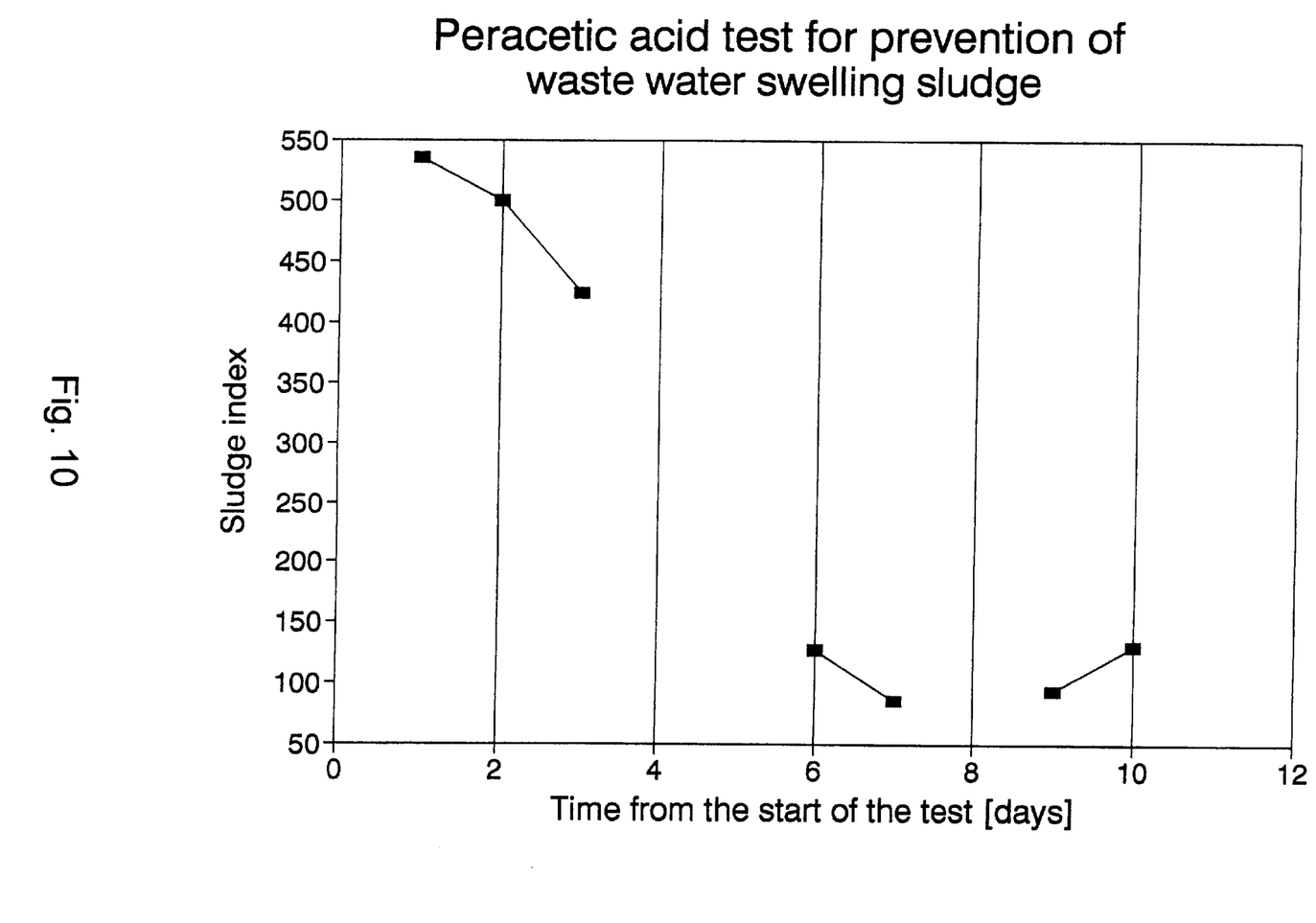
FIG. 10 shows PAA effect on sludge index.

Filaments started to appear at same line after one month. ⅓ of chemical dosed in previous trial during 24 hour was fed directly to the first aerated pool. Concentration of peracetic acid dose was 20 mg/l and returned sludge was 300 l/h. Sludge index came down from over 500 to under 150 under one week and filaments disappeared again. The results from that trial are shown in FIG. 10.

What is claimed is:

1. A method for the purification of waste water containing pollutant material in an activated sludge waste treatment plant comprising treating the waste water sludge with peracetic acid in a concentration which:

preserves the protozoa and invertebrates responsible for the formation of sludge which precipitates together with the pollutant material present;

inhibits the growth of filamentous bacteria, fungi and actinomycetes which prevent the sludge from precipitating;

is at least 0.5 g of peracetic acid/kg of biomass and lower than 45 g of peracetic acid/kg of biomass.

2. A method according to claim 1, characterized in that the concentration of PAA introduced into the sludge treatment tank and the residence time of the sludge before discharge are selected in conjunction with each other such that on discharge the treated sludge contains no residual PAA.

3. A method according to claim 1 characterized in that the residence time of PAA in the sludge is 1.5–30 minutes.

4. A method according to claim 1 characterized in that the residence time of PAA in the sludge is 2.5–20 minutes.

5. A method according to claim 1 characterized in that the dose of PAA is such that the pH decreases by 0.01–1 pH units.

6. A method according to claim 1 characterized in that the dose of PAA is such that the pH decreases by 0.01–0.6 pH units.

7. A method according to claim 1, characterized in that peracetic acid concentration is 1–30 g PAA/kg biomass.

8. A method according to claim 1, characterized in that peracetic acid concentration is 2.5–20 g PAA/kg biomass.

9. A method according to claim 1, characterized in that the residence time of PAA in the sludge is 0.1–45 minutes.

10. A method according to claim 1, characterized in that the conceration of PAA is such that the pH thereof decreases by 0.01–1.5 pH units.

11. A method according to claim 1, characterized in that the concentration of PAA introduced into a sludge treatment tank and the residence time of the sludge before discharge are selected in conjunction with each other such that on discharge the treated sludge contains not more than 0.5 ppm PAA.

12. A method according to claim 1, characterized in that the biomass contains filamentous fungi or filamentous actinomycetes or both.

* * * * *

UNITED STATES PATENT AND TRADEMARK OFFICE
CERTIFICATE OF CORRECTION

PATENT NO. : 6,165,364
DATED : December 26, 2000
INVENTOR(S) : Maunuksela, et. al.

It is certified that error appears in the above-identified patent and that said Letters Patent is hereby corrected as shown below:

Title page,
After "[73] assignee:", read --Oy Finnish Peroxides AB, Finland, and Solvay (Société Anonyme), Belgium--.

Signed and Sealed this

First Day of May, 2001

Attest:

NICHOLAS P. GODICI

Attesting Officer

Acting Director of the United States Patent and Trademark Office